(No Model.)
T. E. ANDERSON.
COMBINED COTTON CHOPPER AND CULTIVATOR.
No. 438,975. Patented Oct. 21, 1890.
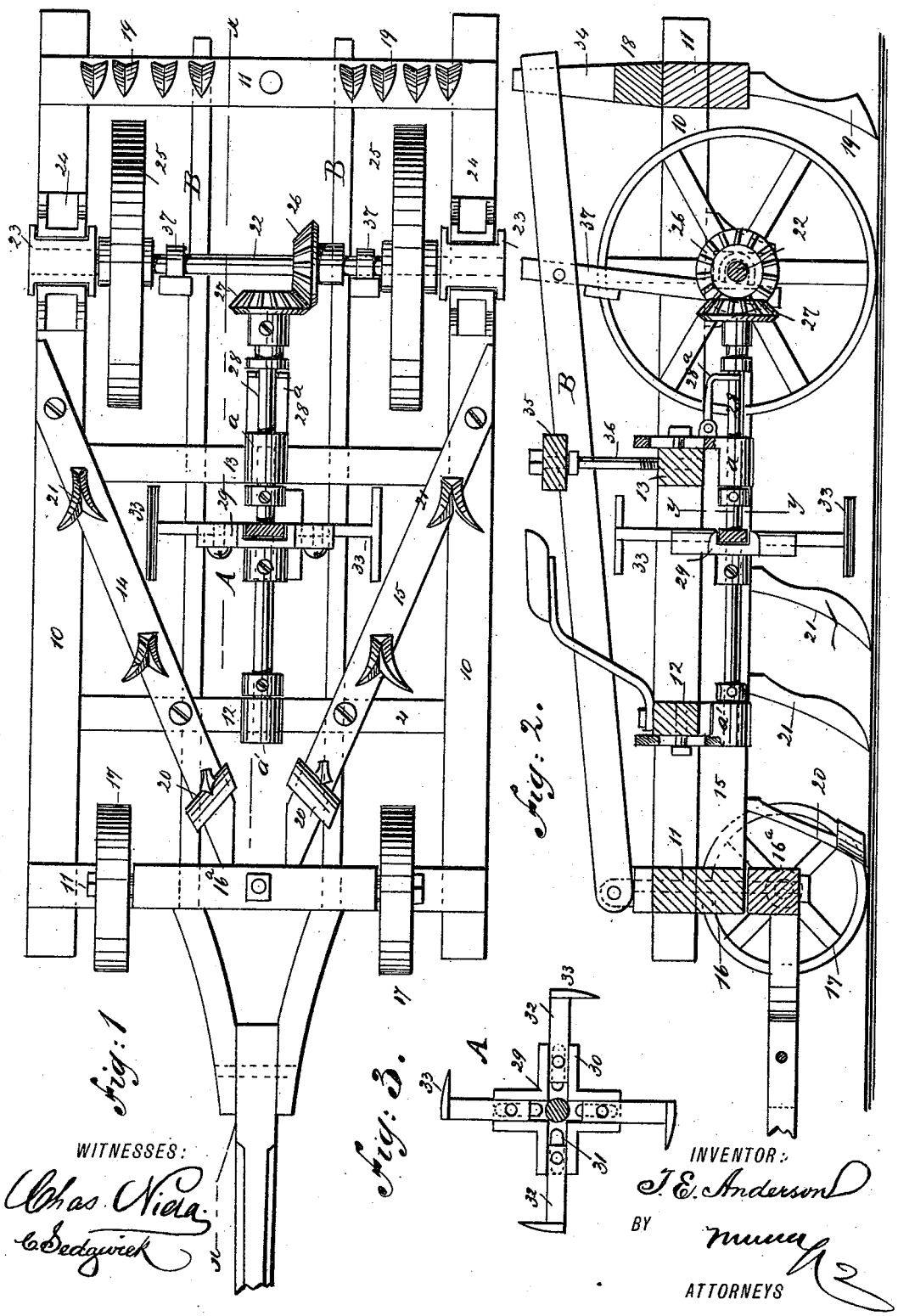
WITNESSES:
Chas. Nida
C. Sedgwick
INVENTOR:
T. E. Anderson
BY
Munn
ATTORNEYS

UNITED STATES PATENT OFFICE.

THOMAS E. ANDERSON, OF MEMPHIS, TENNESSEE.

COMBINED COTTON CHOPPER AND CULTIVATOR.

SPECIFICATION forming part of Letters Patent No. 438,975, dated October 21, 1890.

Application filed July 2, 1890. Serial No. 357,508. (No model.)

*To all whom it may concern:*

Be it known that I, THOMAS E. ANDERSON, of Memphis, in the county of Shelby and State of Tennessee, have invented a new and Improved Combined Cotton Chopper and Cultivator, of which the following is a full, clear, and exact description.

My invention relates to a combined cotton chopper and cultivator, and has for its object to provide an implement of simple, durable, and economic construction provided with hoes for chopping cotton or other plants, cultivators for working the plants, scrapers for clearing the earth in advance of the hoes, and harrow-teeth to be used when desired.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a bottom plan view of the implement. Fig. 2 is a longitudinal vertical section on line $x\ x$ of Fig. 1; and Fig. 3 is a section through the hoe-shaft, illustrating the position of the hoes thereon.

The main frame of the implement consists, preferably, of side bars 10, end bars 11, and two or more intermediate cross-bars 12 and 13. Upon the bottom of the main frame two diagonal side beams 14 and 15 are secured, which beams preferably extend from the outer sides of the side beams 10 of the main frame and terminate at each side of the center of the front end bar. To the bottom of the front end bar a bolster 16 is preferably secured, and upon the axle $16^a$, pivoted to the bolster, the front supporting-wheels 17 of the implement are journaled. The rear end bar of the main frame has preferably attached to its upper side a fixed bolster 18, and in the lower surface of the said end bar a series of cultivator-blades 19 is secured at each side of the center, as best shown in Fig. 1, which cultivator-blades are usually of what is known as the "elk's-foot" pattern.

At or near the forward end of each diagonal beam 14 and 15 a scraper 20 is adjustably secured, and each of said beams is further provided with diagonally-arranged transversely-aligning harrow-teeth 21, the said teeth being bifurcated at their lower ends and the members made to flare in opposite directions. The harrow-teeth 21 are preferably so attached to the beams 14 and 15, which constitute the harrow-frame, as to be capable of vertical adjustment.

The rear axle 22 is journaled in vertically-adjustable boxes 23, held to slide in hangers 24, attached usually to the under face of the side beams 10 of the main frame. Upon the axle 22 the rear supporting-wheels 25 of the implement are secured, and at or near the center of the axle 22 a miter-gear 26 is securely fastened, which miter-gear meshes with a similar gear 27, loosely mounted upon the rear end of a longitudinal shaft 28, which shaft is journaled in bearings $a$ and $a'$, secured to the intermediate cross-bars 12 and 13. The bearings of the shaft 28 are preferably made capable of vertical movement, as shown in Fig. 2. The miter-gear 27 is held in mesh with the miter-gear 26, preferably by means of an angled lock-bar $28^a$, hinged to the rear bearing $a$ of the shaft 28, the lower member of which lock-bar spans the shaft and has a bearing against the hub of the said gear 27, and when the lock-bar is so located the gears 26 and 27 are in mesh. To disconnect the gears, the lock-bar $28^a$ is lifted, the hub of the miter-gear 27 drawn forward upon the shaft, and the lock-bar is permitted to fall into a groove produced upon the hub; but I do not confine myself to this construction for throwing the shaft 28 in and out of gear with the axle 22, as other equivalent or well-known mechanism may be substituted.

Upon the shaft 28, between the beams of the harrow-frame, the chopper A is secured. The chopper consists of a hub 29, provided with a series of radial arms 30, having longitudinal grooves therein and longitudinal slots 31 in said grooves. The grooves constitute slideways for the shanks 32 of hoe-blades 33, one hoe being attached to each radial arm of the hub. The shanks of the hoes are adjustably arranged in the arms of the hub, and the attachment is usually effected by passing suitable bolts through apertures in the shanks and the slots 31 in the slideways to the arms, as best illustrated in Figs. 1 and 3.

A lifting bar or frame B is located longitudinally over the main frame, and one end of the lifting frame or bar is pivoted or hinged to the front end bar of the main frame. The opposite end of the lifting-frame is adapted to slide in openings 34, produced in the upper rear bolster 18, as is best shown in Fig. 2. The lifting-frame usually consists of two parallel side bars connected by suitable cross-bars, and in the center cross-bar 35 of the said lifting-frame the upper end of an adjusting-screw 36 is held to turn, the lower threaded end of which adjusting-screw engages one of the cross-bars of the main frame.

The lifting-frame is provided near its rear end with downwardly-extending hangers 37, which hangers receive the rear axle 22. Thus by manipulating the adjusting-screw 36 the rear end of the lifting-frame is elevated, and the elevation of the frame causes the rear axle 22 and connecting-shaft 28 to be elevated also. Thus the depth that the scrapers and the rear cultivators 19 shall run in the ground is readily regulated. The depth to which the hoes shall cut is regulated by adjusting the said hoes upon their carrying-hub.

In operation, the rear supporting-wheels having been properly set by the manipulation of the elevating or adjusting frame B and the hoes having been properly adjusted upon their carrying-hub, as the implement is drawn forward the scrapers 20 remove any trash or material upon the ground that would interfere with the action of the hoes, and the hoes, following immediately after, being rapidly revolved, enter the ground one after the other and remove the surplus plants. The cultivators 19 at the rear pass between the remaining plants located at each side of the space created by the hoes and effectually cultivate said plants by throwing the earth up over their roots. The harrow-teeth 21 when the hoes are in operation may be employed also; but preferably they are adjusted so as not to touch the plants or the ground, the harrow-teeth being adapted for use in connection with the rear cultivator-teeth only, and when the harrow-teeth are used the hoe-shaft 28 is preferably thrown out of gear with the rear driving-axle 22.

Having thus described my invention, I claim as new and desire to secure by Letters Patent—

1. A cotton chopper and cultivator comprising a frame having teeth or blades in its rear cross-bar and provided with diagonal beams on its under surface forming a harrow-frame, and having a scraper and harrow-teeth and revolving chopper mounted in the frame between the beams of the harrow, substantially as described.

2. In a cotton chopper and cultivator, the combination, with the main frame having cultivator-blades in its rear cross-bar, of the diagonal beams 14 and 15 on the under side of the frame and each provided with a scraper 20 and harrow-teeth 21, substantially as herein shown and described.

3. In a cotton chopper and cultivator, the combination, with a frame mounted on wheels and carrying cultivator-teeth, of the lifting-frame B, pivoted to the front of the frame and having its rear end working in openings in the rear bolster of the frame, a screw turning freely in the frame B and engaging a cross-bar of the main frame, and hangers connected to the frame B and engaging the rear axle, substantially as herein shown and described.

4. In an implement of the character described, the combination, with a main frame, a vertically-adjustable axle, a vertically-adjustable longitudinal shaft driven from the axle, and an adjusting-frame connected with the axle, of hoes radially connected with the shaft, cultivator-teeth arranged in gangs at the rear of the main frame, a harrow-frame attached to the main frame of the implement at the bottom thereof, harrow-teeth secured to the harrow-frame, having bifurcated lower ends, and scrapers attached to the nose of the harrow-frame, as and for the purpose specified.

THOMAS E. ANDERSON.

Witnesses:
J. D. ANDERSON,
T. C. LOWREY.